(12) United States Patent
Proctor et al.

(10) Patent No.: US 8,712,949 B2
(45) Date of Patent: Apr. 29, 2014

(54) MULTI-DIMENSIONAL TUPLE SUPPORT IN RULE ENGINES

(75) Inventors: Mark Proctor, Chiswick (GB); Edson Tirelli, Montreal (CA)

(73) Assignee: Red Hat, Inc., Raleigh, NC (US)

( * ) Notice: Subject to any disclaimer, the term of this patent is extended or adjusted under 35 U.S.C. 154(b) by 454 days.

(21) Appl. No.: 12/959,186

(22) Filed: Dec. 2, 2010

(65) Prior Publication Data

US 2012/0143811 A1    Jun. 7, 2012

(51) Int. Cl.
*G06N 5/02* (2006.01)
*G06F 17/00* (2006.01)

(52) U.S. Cl.
USPC ............................................................ 706/48

(58) Field of Classification Search
None
See application file for complete search history.

(56) References Cited

U.S. PATENT DOCUMENTS

2010/0205205 A1* 8/2010 Hamel .......................... 707/769

OTHER PUBLICATIONS

Banks, Using Workflow Rules to Iterate and Remove Items from a Collection, Oct. 2007.*
Winkler, Sudoku Validator, part I—Rules and Collections, Sep. 2006.*

* cited by examiner

*Primary Examiner* — Jeffrey A Gaffin
*Assistant Examiner* — Mikayla Chubb
(74) *Attorney, Agent, or Firm* — Lowenstein Sandler LLP

(57) ABSTRACT

A method to support multi-dimensional tuples in rule engines having rule engine executed by a processing device can evaluate facts in a working memory stored on a data storage device against a rule with repetitions. The rule engine may create a multi-dimensional tuple to hold a set of the facts that matches the rule. The multi-dimensional tuple has a set of elements and an index for each of the elements. Each element of the multi-dimensional tuple is a single fact or a tree structure for holding a set of facts of a repetition group that matches the rule with repetitions.

20 Claims, 14 Drawing Sheets

MULTI-DIMENSIONAL TUPLE SUPPORT IN RULE ENGINES

TECHNICAL FIELD

Embodiments of the present invention relate to artificial intelligence, and more specifically to rule engines.

BACKGROUND

The development and application of rule engines is one branch of Artificial Intelligence (A.I.), which is a very broad research area that focuses on "making computers think like people." Broadly speaking, a rule engine processes information by applying rules to data objects (also known as facts; or simply referred to as data). A rule is a logical construct for describing the operations, definitions, conditions, and/or constraints that apply to some predetermined data to achieve a goal. Various types of rule engines have been developed to evaluate and process rules. Conventionally, a rule engine implements a network to process rules and data objects, which can also be referred to as facts. A network may include many different types of nodes, including, for example, object-type nodes, alpha nodes, left-input-adapter nodes, eval nodes, join nodes, not nodes, accumulate nodes, and terminal nodes, etc. Some conventional rule engines build Rete networks, and hence, are referred to as Rete rule engines.

Typically, data objects enter a network at the root node, from which they are propagated to any matching object-type nodes. From an object-type node, a data object is propagated to either an alpha node (if there is a literal constraint), a left-input-adapter node (if the data object is the left most object type for the rule), or a beta node (such as a join node).

A beta node has two inputs, unlike one-input nodes, such as object-type nodes and alpha nodes. A beta node can receive tuples in its left-input and data objects, or simply referred to as objects, in its right-input. A tuple is a single-dimensional data structure containing a set of facts that have matched a rule. Join nodes, not nodes, and exist nodes are some examples of beta nodes. All nodes may have one or more memories to store a reference to the data objects and tuples propagated to them, if any. For example, a beta node can have a left memory and a right memory associated with its left input and right input, respectively. The left-input-adapter node creates a tuple with a single data object and propagates the tuple created to the left input of the first beta node connected to the left-input-adapter node, where the tuple is placed in the left memory of the beta node and then join attempts are made with all the objects in the right memory of the beta node.

When another data object enters the right input of the join node, the data object is placed in the right memory of the join node and join attempts are made with all the tuples in the left memory of the join node. The tuples placed in the left memory of the join node are partially matched. If a join attempt is successful, the data object is added to the tuple, which is then propagated to the left input of the next node in the network. Such evaluation and propagation continue through other nodes down the network, if any, until the tuple reaches the terminal node. When the tuple reaches the terminal node, the tuple is fully matched. At the terminal node, an activation is created from the fully matched tuple and the corresponding rule. The activation is placed onto an agenda of the rule engine for potential firing or potential execution.

As mentioned above, a tuple contains a set of facts that match a rule. So, for example, consider the following pseudo code of a rule:

```
RuleX
   When
        Customer ( ) and
        Order ( ) and
        ShippingAddress ( )
   Then
        // perform some operations
   End
```

The above rule can match each combination of Customer, Order, and ShippingAddress facts in the working memory. These combinations are called tuples and can be represented in the following way:
Tuple1=[customer1, order1, shippingaddress1],
where Tuple1 is an arbitrary name given to the tuple, customer1 is an instance of Customer, order1 is an instance of Order, and ShippingAddress is an instance of ShippingAddress.

All tuples matching the above rule always have its component facts in the exact order in which they match the patterns in the rule. Thus, a numeric index can be defined for each element in the tuple. The numeric index is also referred to as an "offset." So, the first fact in a tuple has offset 0, the second fact has offset 1, and so on. Referring back to the above example, individual elements of Tuple1 can thus be referenced by:
Tuple1[0]=customer1;
Tuple1[1]=order1;
Tuple1[2]=shippingaddress1

Although the above conventional tuple can be used for a wide range of applications, there are situations in which it is not powerful or flexible enough. For instance, when support to repetitions are necessary, such as:
A( ) and [1-10]B( ) and C( ),
where A( ), B( ), and C( ) are patterns of the rule in the current example, which intends to match one A, between 1 and 10 B's and one C. Suppose in one working memory, there are two (2) B's matching the above rule, and thus, the following tuple may be resulted:
T2=[a1, b1, b2, c1]
For another working memory, there are three B's matching the above rule, and thus, the following tuple may be resulted:
T3=[a1, b1, b2, b3, c1]

As shown in the above example, the tuples T2 and T3 have different lengths and offsets between different instantiations of the working memory. For instance, c1 would have offset 3 in T2, and 4 in T3. This would also cause problems for rule authors because it would be difficult, if not impossible, for them to unambiguously address elements in such tuples.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method and an apparatus to support multi-dimensional tuples in a rule engine. In general, a rule engine processes data by evaluating data against a set of rules. Typically, the set of rules are in a rule file, which can be compiled and executed by a rule engine to evaluate data against the rules. The data includes data objects asserted in a working memory of the rule engine, which can also be referred to as facts.

In some embodiments, the rule engine can evaluate facts in a working memory of the rule engine against a rule with repetitions. In general, a rule with repetitions refers to a rule having at least one pattern (e.g., ShippingCountry="United States"; OrderTotal >$100; etc.), which can have multiple facts matched in an instance of the working memory simultaneously. All the facts matching the pattern in the instance of the working memory can be collectively referred to as a repetition group. The rule engine may create a multi-dimensional tuple (also referred to as a tree tuple) to hold a set of the facts that matches all patterns of the rule. The multi-dimensional tuple has a set of elements. The multi-dimensional tuple may further include a distinct index for each of the elements. Like the offset in a conventional tuple, the index distinctly identifies an element of the multi-dimensional tuple. Each element of the multi-dimensional tuple is a single fact or a tree structure for holding a set of facts of a repetition group that matches the rule with repetitions. Multi-dimensional tuples can be useful in supporting more complex rules, such as rules that require multiple calculations to be executed on the same set of facts. Results from the multiple calculations can be stored in a multi-dimensional tuple to be propagated through a network built according to the rules. With the multi-dimensional tuple, the results from the multiple calculations can be unambiguously identified and conveniently organized. More details of some embodiments of a method and an apparatus to support multi-dimensional tuples in a rule engine are described below.

Figure 1:
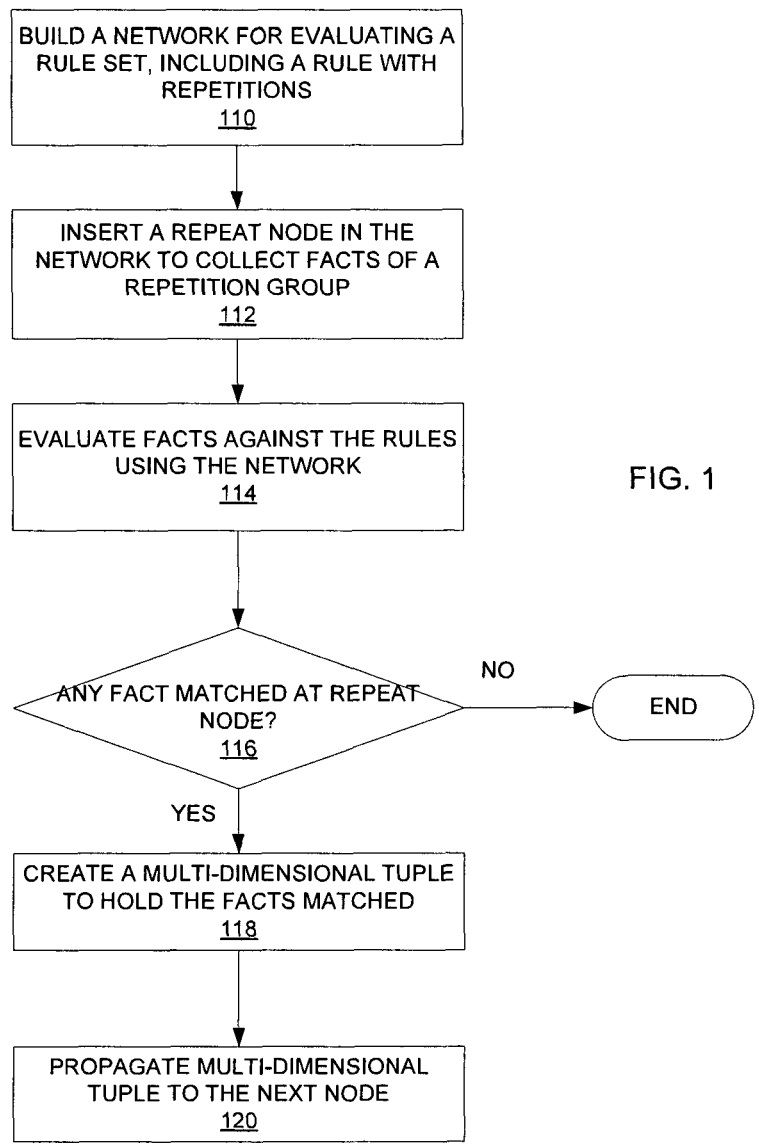
FIG. 1 illustrates one embodiment of a method to support multi-dimensional tuples.

FIG. 1 illustrates one embodiment of a method to support multi-dimensional tuples. Initially, the rule engine builds a network for evaluating a set of rules in a rule set, such as a Rete network (processing block 110). The set of rules may be provided by a user of the rule engine. For example, in a business application, the set of rules includes business rules pertaining to business transactions (e.g., medical insurance claim processing, mortgage application, etc.). Further, the set of rules includes a rule with repetitions. For this rule, the rule engine may create a single repeat node and insert the repeat node in the network for collecting facts of a repetition group of the rule (processing block 112). In some embodiments, the repeat node can be implemented using an accumulate node. The repeat node can wrap matched facts into a special set of tuple nodes and add them to the tuple in the appropriate slot, effectively creating the multi-dimensional tuple, and setting the proper offset indices. Details of one embodiment of a repeat node are discussed below with reference to FIG. 3.

In some embodiment, the rule engine evaluates facts in a working memory of the rule engine against the rules using the network built (processing block 114). A working memory of the rule engine is a logical space for holding facts asserted. Note that the network may include additional different types of nodes (such as object type nodes, left adaptor nodes, beta nodes, and alpha nodes, etc.), which are connected to each other in the network such that tuples containing facts can be propagated from one node to another through the network when the data objects are matched at a respective node. When a tuple reaches the repeat node, the rule engine evaluates the facts in the working memory against the rule with repetitions and determines if there are any facts matched (processing block 116). If there are facts matched, then the rule engine may create a multi-dimensional tuple to hold the facts matched (processing block 118). Then the rule engine can propagate the multi-dimensional tuple to the next node in the network (processing block 120). Otherwise, if there is no fact matched at the repeat node at block 116, then the rule engine ends the process. Details of some embodiments of algorithms usable to implement the repeat node are discussed below.

In some embodiments, the rule engine usable to perform the above method comprises processing logic implemented with hardware (e.g., circuitry, dedicated logic, programmable logic, microcode, etc.), software (such as instructions run on a processing device), firmware, or a combination thereof For example, the rule engine may be executable on a processing device running in a computing machine (e.g., a personal computer (PC), a server, a laptop computer, a tablet computer, a personal digital assistant (PDA), a smart phone, etc.). The processing device can include one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. The computing machine may further include machine-readable storage medium (a.k.a. computer-readable storage medium) coupled to the processing device, to store data (e.g., the working memory, node memories, etc.) and/or instructions. The machine-readable storage medium may include one or more of a read-only memory (ROM), a flash memory, a dynamic random access memory (DRAM), a static random access memory (SRAM), etc. In addition, the computing machine may include other components, such as a network interface device, a video display unit (e.g., a liquid crystal display (LCD), a touch screen, a cathode ray tube (CRT), etc.), an alphanumeric input device (e.g., a keyboard, a touch screen, etc.), a cursor control device (e.g., a mouse, a joystick, a touch screen, etc.), a signal generation device (e.g., a speaker), etc.

By providing support for multi-dimensional tuples as discussed above, the rule engine can be made more powerful and flexible. This is because multi-dimensional tuples can have variable lengths and different offsets between different instantiations. Thus, multi-dimensional tuples work well with rules with repetitions. An example of a rule with repetitions and an exemplary multi-dimensional tuple are discussed below to further illustrate the concept.

To address such situations, we defined the concept of multi-dimensional tuples (a.k.a. tree tuples), where each offset in the tuple may represent a single element or a tree of elements. For instance, referring back to the above example in which the following rule is defined:

A( ) and [1-10]B ( ) and C( ), and the following two tuples are resulted from two different working memories:

T2=[a1, b1, b2, d]; and
T3=[a1, b1, b2, b3, c1].

Applying the concept of multi-dimensional tuples, T2 may be represented by:

T2=[a1, B*, c1], where B* is a tree with leaves B*=[b1, b2]. Likewise, T3 may be represented by:
T3=[a1, B*, c1], where B* is a tree with leaves B*=[b1, b2, b3].

In the above example, a1 has the same offset (i.e., 0) in both tuples; and likewise, c1 also has the same offset (i.e., 2) in both tuples, and can be addressed by T2[2] and T3[2]. Note that offset 1 is a collection of B's with 2 elements in T2 and 3 elements in T3.

Such approach is flexible and powerful enough to represent many different tuples that match rules with repetitions. For example, consider another exemplary rule like: [1-5](A( ) and [1-3]B( ) and C( ). The above rule is meant to match between 1 and 5 sets of 1 A followed by between 1 and 3 B's, where the whole set of sets is followed by a single C. In this case, there are multiple levels of nested patterns, in which the usefulness of a tree structure becomes clear. One embodiment of a tuple matching the above rule, T4, is shown in FIG. 2.

Figure 2:
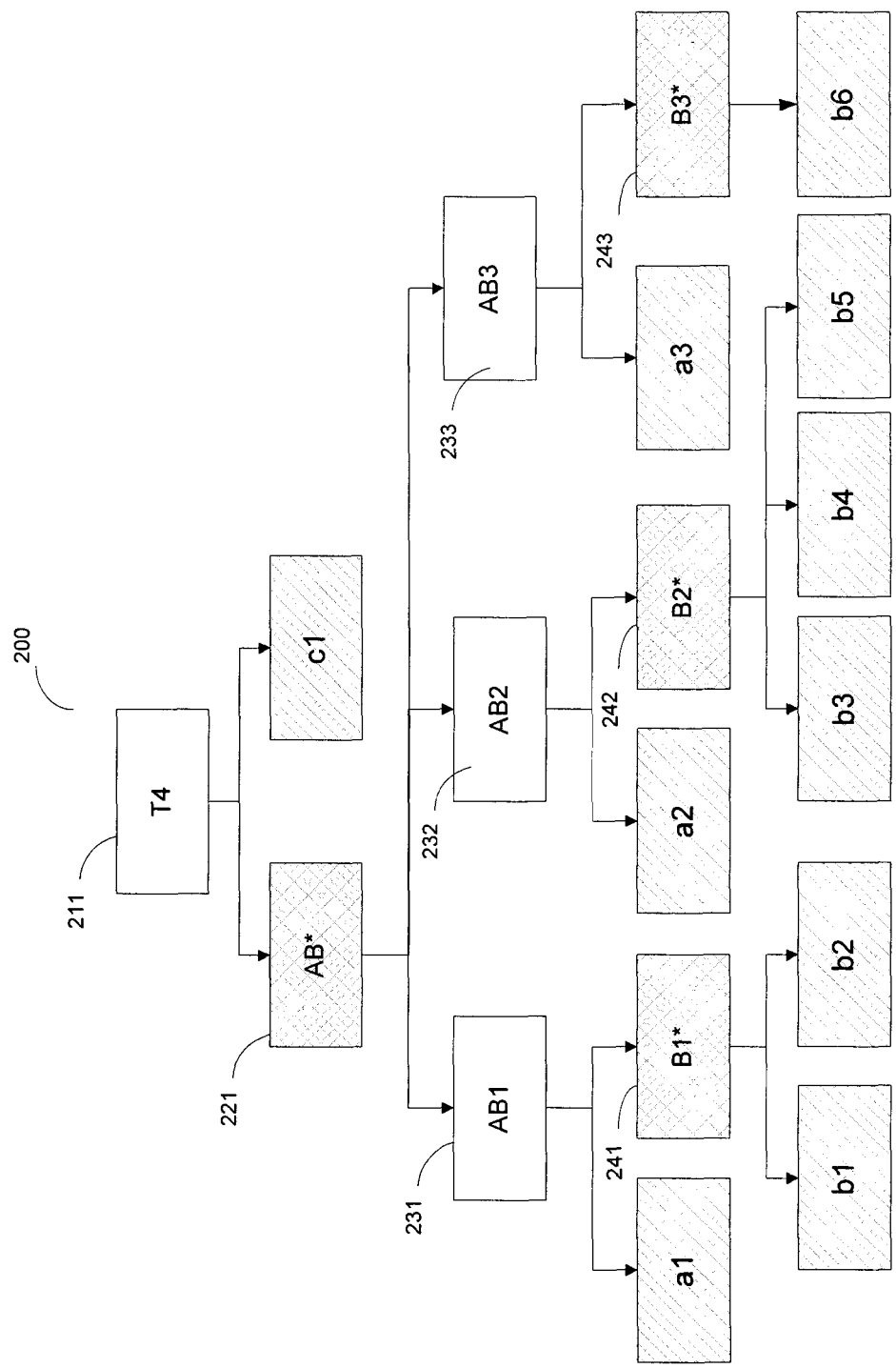
FIG. 2 illustrates one embodiment of a multi-dimensional tuple.

Referring to FIG. 2, the entire tuple T4 can be represented as a tree structure 200. The tuple 200 includes multiple leaf nodes, each representing a fact matching one of the patterns of the rule (i.e., a1, a2, a3, b1, b2, b3, b4, b5, b6, and c1). The tuple 200 further includes four repetition placeholders, namely, AB* 221, B1* 241, B2* 242, and B3* 243; and four single element placeholders, namely, T4 211, AB1 231, AB2 232, and AB3 233. One way of writing the same tuple in textual format using ( ) for nested elements would be:

T4=[((a1, (b1, b2)), (a2, (b3, b4, b5)), (a3, (b6))), c1]

When using a multi-dimensional tuple, it is still possible to address individual elements using offset indexes, by simply attributing offsets for each of the tree levels. For instance, in T4 above, one could write the following references:

T4[0]=AB*
T4[1]=c1
T4[0][1]=AB2
T4[0][1][1][0]=b3

However, these types of references may be too complex for some rule authors to use. Also, the above references do not support querying and constraining the number of matches on repeated elements. One solution to the above problem is to allow repeated patterns and groups to be labeled in substantially the same way as single patterns can be labeled. For instance, the patterns, A( ) and B( ) and C( ) in the above exemplary rule can be labeled as "$a:A( ) and $b:B( ) and $c:C." In other words, instead of using offset indexes and writing Tn[2] to access the C fact in a given tuple, one can simply use: Tn. $c. Such approach can also be used for repetition groups as shown below:

$a:A and $b:[1-10] B( ) and $c:C( )

For the above example, $b can be used to access the collection of all B's matched on a given tuple, and $b[1] would be the second B element matched in that tuple.

Using the above approach, the complex rule in the above example can be re-written as:

$ab: [1-5]($a:A( ) and $b:[1-3]B( ) and $c:C( )

Further, the same elements discussed above can be represented as:

$ab=T4[0]=AB*
$c=T4[1]=c1
$ab[1]=T4[0][1]=AB2
$ab[1].$b[0]=T4[0][1][1][0]=b3

In some embodiments, a set of properties can be further defined for querying repeated elements. The properties may include: length, first, last, and iterator. "Length" returns the number of elements in a particular repetition group. "First" returns the first element in a particular repetition group. Likewise, "last" returns the last element in a particular repetition group. "Iterator" returns an iterator for all elements in a particular repetition group. For instance, in the above example, $ab.length is three (3), $ab.first is AB1, and $ab.last is AB3. Note that the above four properties merely serve as examples to illustrate the concept. One should appreciate that other properties may be defined in different embodiments to query repeated elements.

In order to support multi-dimensional tuples, a new Rete node to collect the repeated elements in a repetition group is defined in some embodiments. The new Rete node may be referred to as a repeat node. In general, a repeat node wraps matched facts into a special set of tuple nodes and adds them to the tuple in the appropriate slot, effectively creating the multi-dimensional tuple, and setting the proper offset indexes according to some embodiments. The repeat node can be a two-input node similar to an accumulate node in a Rete rule engine. One embodiment of a repeat node is discussed in details below.

Figure 3:
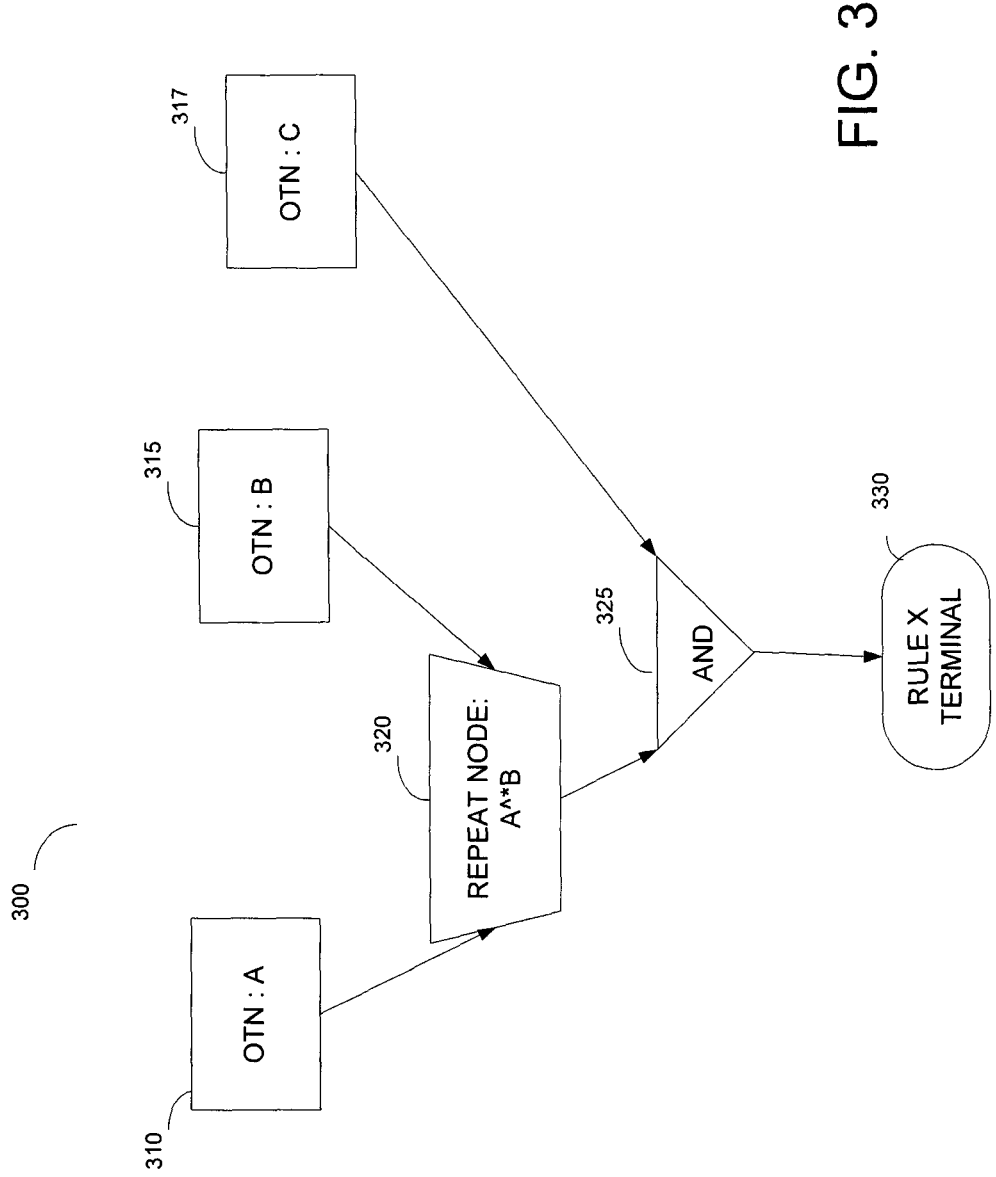
FIG. 3 illustrates one embodiment of a simplified Rete network.

FIG. 3 illustrates one embodiment of a Rete network including a repeat node for evaluating the following rule:

A( ) and NB( ) and C( ) where [*] means any number of B's

Figure 4:
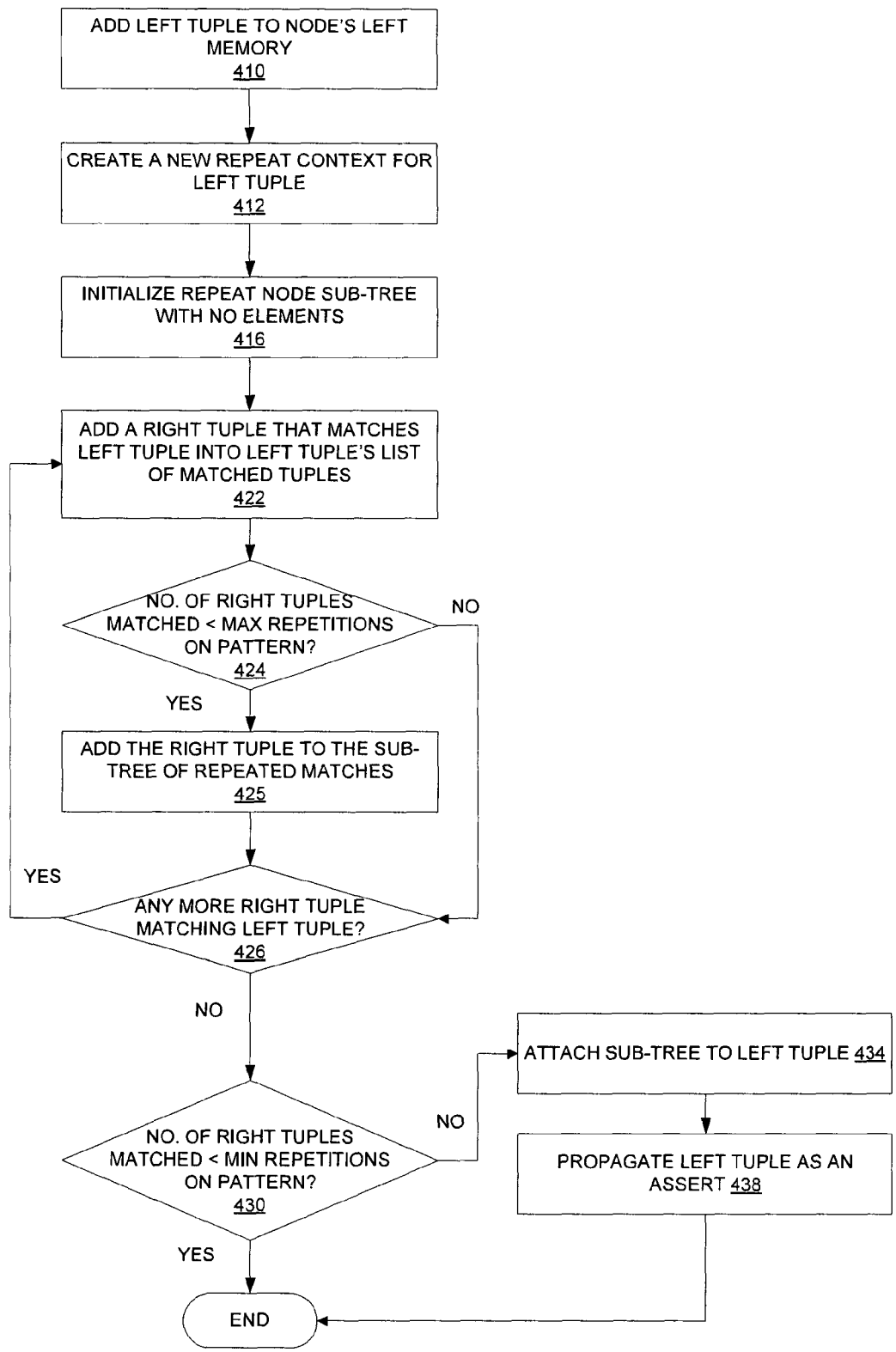
FIG. 4 illustrates one embodiment of a method to support left tuple assertion.

The network 300 includes three object type nodes (OTN) 310, 315, and 317, a repeat node 320, an and node 325, and a terminal node 330. The OTNs 310 and 315 forwards facts matching patterns A( ) and B( ), respectively, to the repeat node 320. The repeat node 320 wraps facts matching the rule A^*B into a special set of tuple slots and add them to the tuple in the appropriate slot (such as leaf nodes holding b1, b2, etc. in FIG. 2), effectively creating the multi-dimensional tuple, and setting the proper offset indexes. The tuple can then be propagated into the and node 325, which also receives facts from OTN 317. Matched facts can be further added into the tuple at the and node 325 and the tuple can be further propagated into the terminal node 330 to be fired (or executed). Some embodiments of the various algorithms usable to implement the repeat node 320 are discussed below. The discussion is divided into six parts, corresponding to left tuple assertion, left tuple retraction, left tuple modification, right tuple assertion, right tuple retraction, and right tuple modification at some embodiments of a repeat node. It should be appreciated that the changes described below may be varied or optimized in other embodiments FIG. 4 illustrates one embodiment of a method to support left tuple assertion. The method can be performed by a rule engine executable on a computing machine, such as the one described above. Initially, the rule engine adds a left tuple to the repeat node's left memory (processing block 410). Then the rule engine creates a new repeat context for the left tuple (processing block 412). The rule engine initializes a repeat node sub-tree with no elements in it (processing block 416).

In some embodiments, the rule engine adds a right tuple from the repeat node's right memory that matches the left tuple to the left tuple's list of matched tuples (processing block 422). Then the rule engine checks if the number of right tuples matched is less than the maximum number of repetitions on the pattern (processing block 424). If not, then the rule engine transitions to block 426. Otherwise, the rule engine adds the right tuple to the sub-tree of repeated matches (processing block 425). Then the rule engine checks if there is any more right tuple in the right memory matching the left tuple (processing block 426). If there is, then the rule engine returns to processing block 422 to repeat the above operations. Otherwise, the rule engine transitions to block 430.

At block 430, the rule engine checks if the number of right tuples matched is less than the minimum repetitions on the pattern (processing block 430). If so, the process ends. Otherwise, the rule engine attaches the sub-tree to the left tuple (processing block 434) and then propagates the left tuple as an assert (processing block 438).

Figure 5:
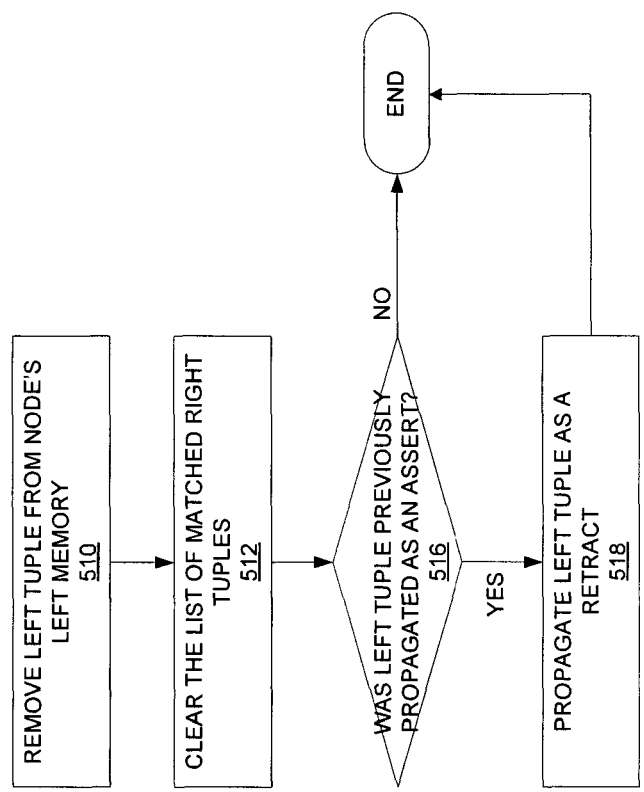
FIG. 5 illustrates one embodiment of a method to support left tuple retraction.

FIG. 5 illustrates one embodiment of a method to support left tuple retraction in a repeat node. The method can be performed by a rule engine executable on a computing machine, such as the one described above. Initially, the rule engine removes a left tuple from the repeat node's left memory (processing block 510). Then the rule engine clears the left tuple's list of matched right tuple (processing block 512). Next, the rule engine checks if the left tuple was previously propagated (processing block 516). If not, then the process ends. Otherwise, the rule engine propagates the left tuple as a retract (processing block 518).

Figure 6A:
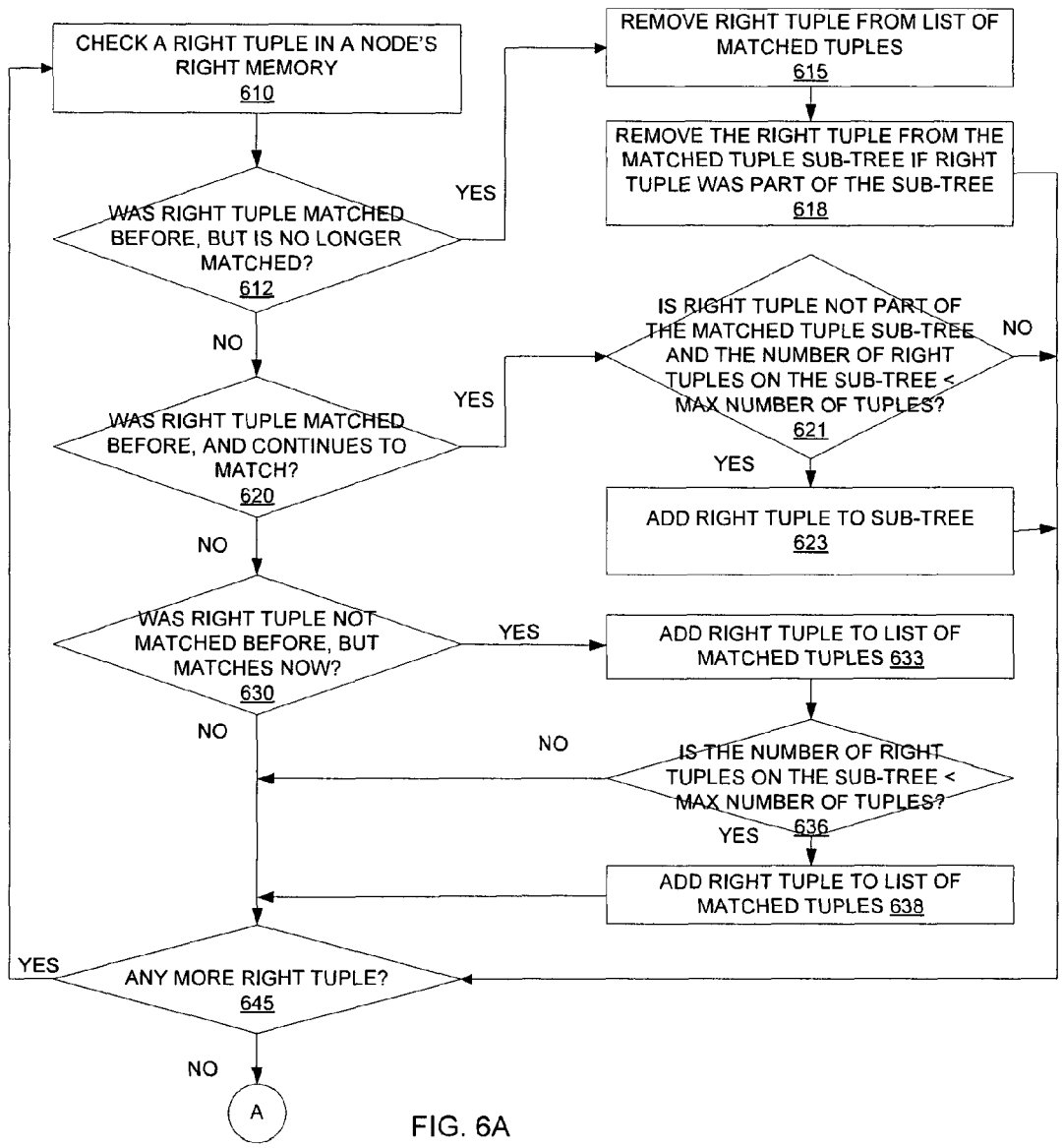
FIGS. 6A and 6B illustrate one embodiment of a method to support left tuple modification.
Figure 6B:
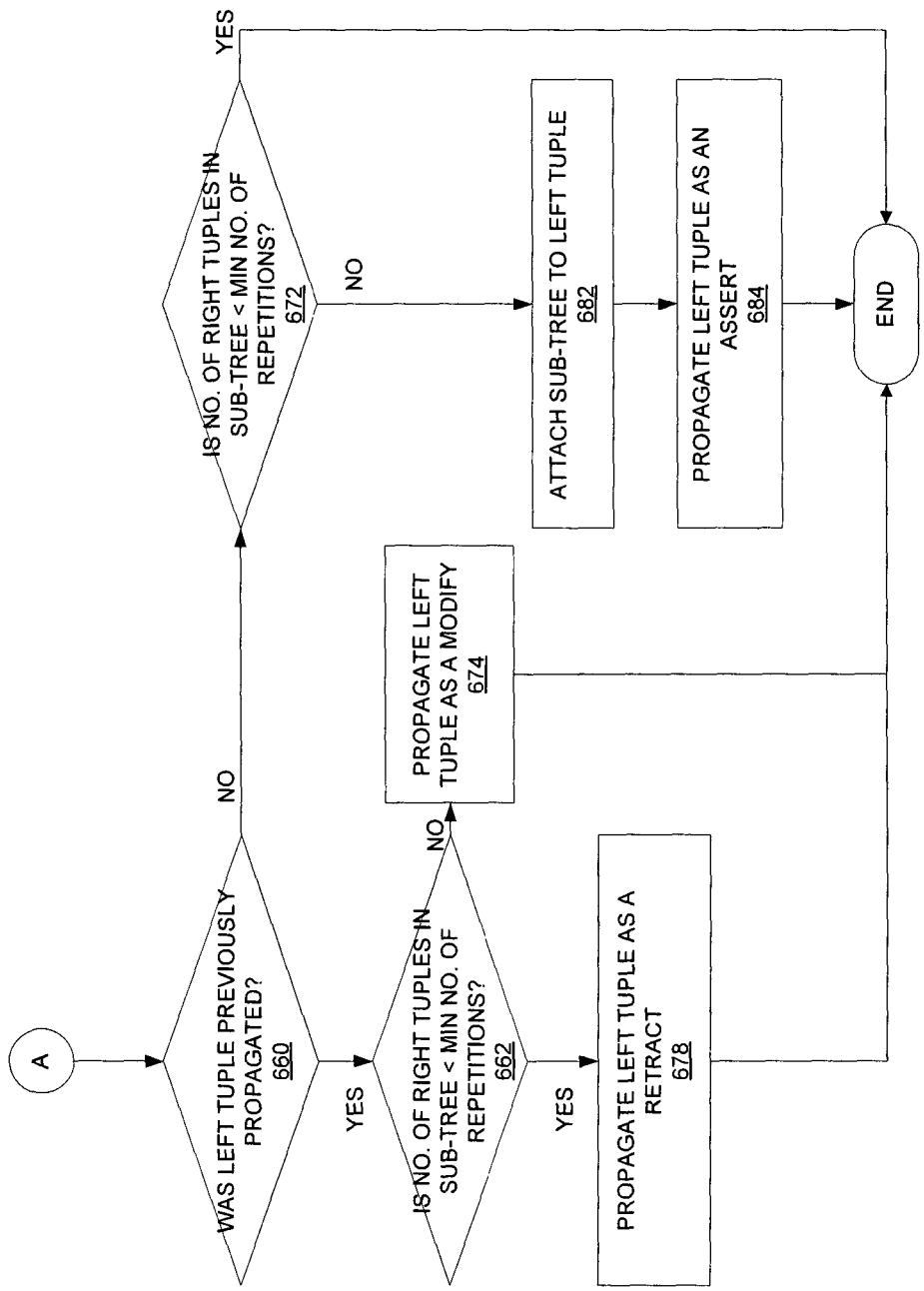

FIGS. 6A and 6B illustrate one embodiment of a method to support left tuple modification. The method can be performed by a rule engine executable on a computing machine, such as the one described above. Referring to FIG. 6A, the rule engine checks a right tuple in a repeat node's right memory (processing block 610). Then the rule engine determines if the right tuple was matched before, but no longer matched (processing block 612). If so, the rule engine transitions to block 615. Otherwise, the rule engine determines if the right tuple was matched before, and continues to match (processing block 620). If so, the rule engine transitions to block 621. Otherwise, the rule engine determines if the right tuple was not matched before, but matches now (processing block 630). If so, the rule engine transitions to block 633. Otherwise, the rule engine checks if there is any more right tuple in the node's right memory (processing block 645). If there is, then the rule engine returns to block 610 to repeat the above operations on another right tuple. If not, the rule engine transitions to block 660 in FIG. 6B.

As discussed above, if the right tuple was matched before, but no longer matched, the rule engine transitions to block 615. The rule engine removes the right tuple from the list of matched tuples (processing block 615), and then the rule engine removes the right tuple from the matched tuple sub-tree if the right tuple was part of the sub-tree (processing block 618). The rule engine then transitions to block 645.

If the right tuple was matched before, and continues to match, the rule engine transitions to block 621. The rule engine checks if the right tuple is not part of the matched tuple sub-tree and if the number of right tuples on the sub-tree is less than the maximum number of right tuples (processing block 621). If so, the rule engine adds the right tuple to the sub-tree (processing block 623) and then transitions to block 645.

If the right tuple was not matched before, but matches now, then the rule engine transitions to block 633. The rule engine adds the right tuple to the list of matched tuples (processing block 630. Then the rule engine checks if the number of right tuples on the sub-tree is less than the maximum number of right tuples (processing block 633). If so, the rule engine adds the right tuple to the sub-tree (processing block 638) and then transitions to block 645. Otherwise, the rule engine directly transitions to block 645.

Referring to FIG. 6B, the rule engine checks if the left tuple was previously propagated (processing block 660). If so, the rule engine checks if the number of right tuples in the sub-tree is less than the minimum number of repetitions (processing block 662). If so, the rule engine propagates the left tuple as a retract (processing block 678). Otherwise, the rule engine propagates the left tuple as a modify (processing block 674).

If the left tuple was not previously propagated, then the rule engine checks if the number of right tuples in the sub-tree is less than the minimum number of repetitions (processing block 672). If so, the process ends. Otherwise, the rule engine attaches the sub-tree to the left tuple (processing block 682) and then propagates the left tuple as an assert (processing block 684).

Figure 7:
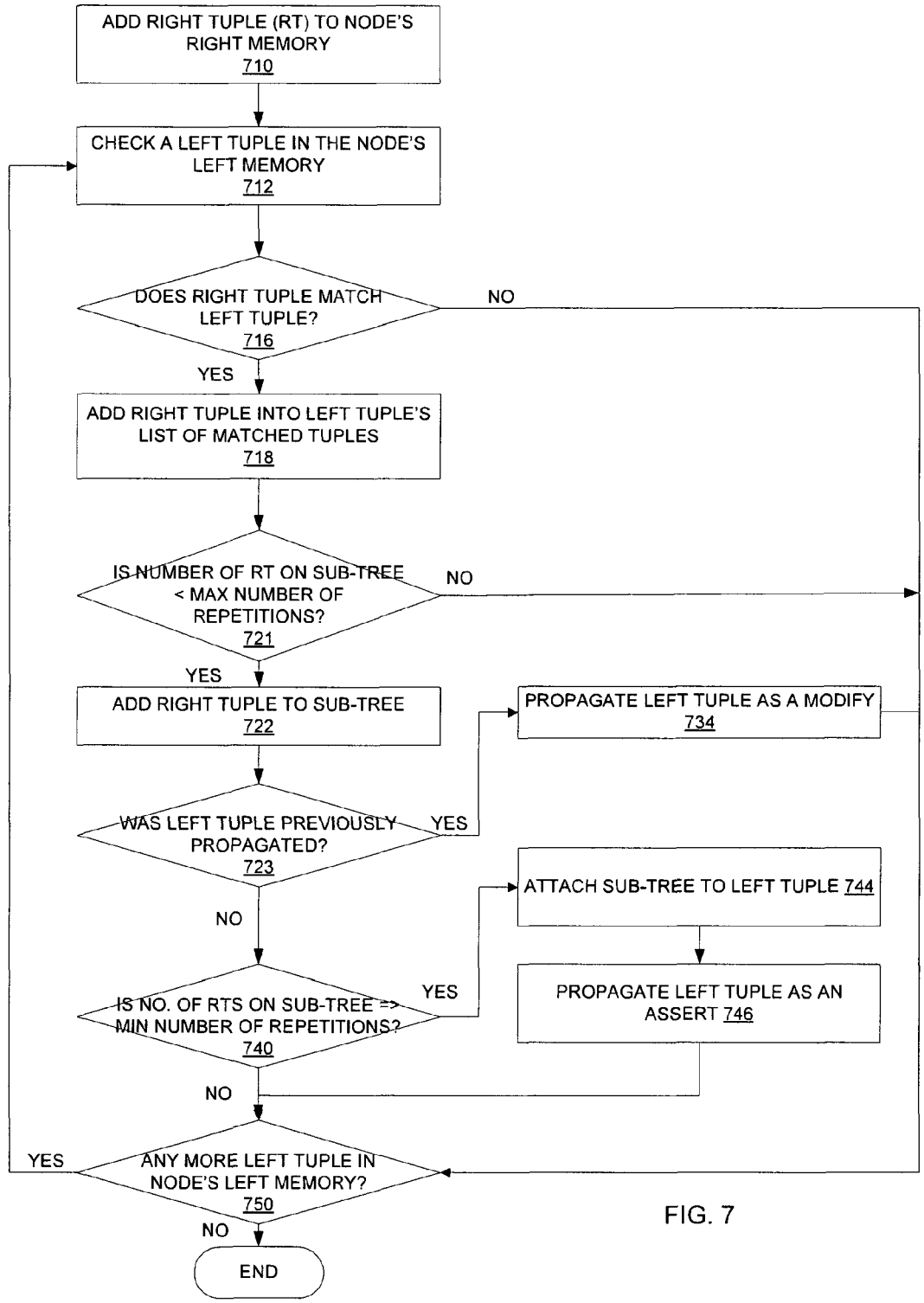
FIG. 7 illustrates one embodiment of a method to support right tuple assertion.

FIG. 7 illustrates one embodiment of a method to support right tuple assertion. The method can be performed by a rule engine executable on a computing machine, such as the one described above. Initially, the rule engine adds a right tuple to a repeat node's right memory (processing block 710). Then the rule engine checks a left tuple in the node's left memory (processing block 712). The rule engine determines if the right tuple matches the left tuple (processing block 716). If not, the rule engine transitions to block 750. Otherwise, if the right tuple matches the left tuple, the rule engine adds the right tuple into the left tuple's list of matched tuples (processing block 718). The rule engine further checks if the number of right tuples on the sub-tree is less than the maximum number of repetitions (processing block 721). If not, the rule engine transitions to block 750. Otherwise, the rule engine adds the right tuple to the sub-tree (processing block 722) and then transitions to block 723.

In some embodiments, the rule engine checks if the left tuple was previously propagated (processing block 723). If so, the rule engine propagates the left tuple as a modify (processing block 734) and then transitions to block 750. Otherwise, the rule engine checks if the number of right tuples in the sub-tree is greater than or equal to the minimum number of repetitions (processing block 740). If so, the rule engine attaches the sub-tree to the left tuple (processing block 744) and propagates the left tuple as an assert (processing block 746) before transitioning to block 750. Otherwise, the rule engine transitions to block 750.

At block 750, the rule engine checks if there is any more left tuple in the node's left memory. If there is, then the rule engine returns to block 712 to repeat the above operations. Otherwise, the process ends.

Figure 8:
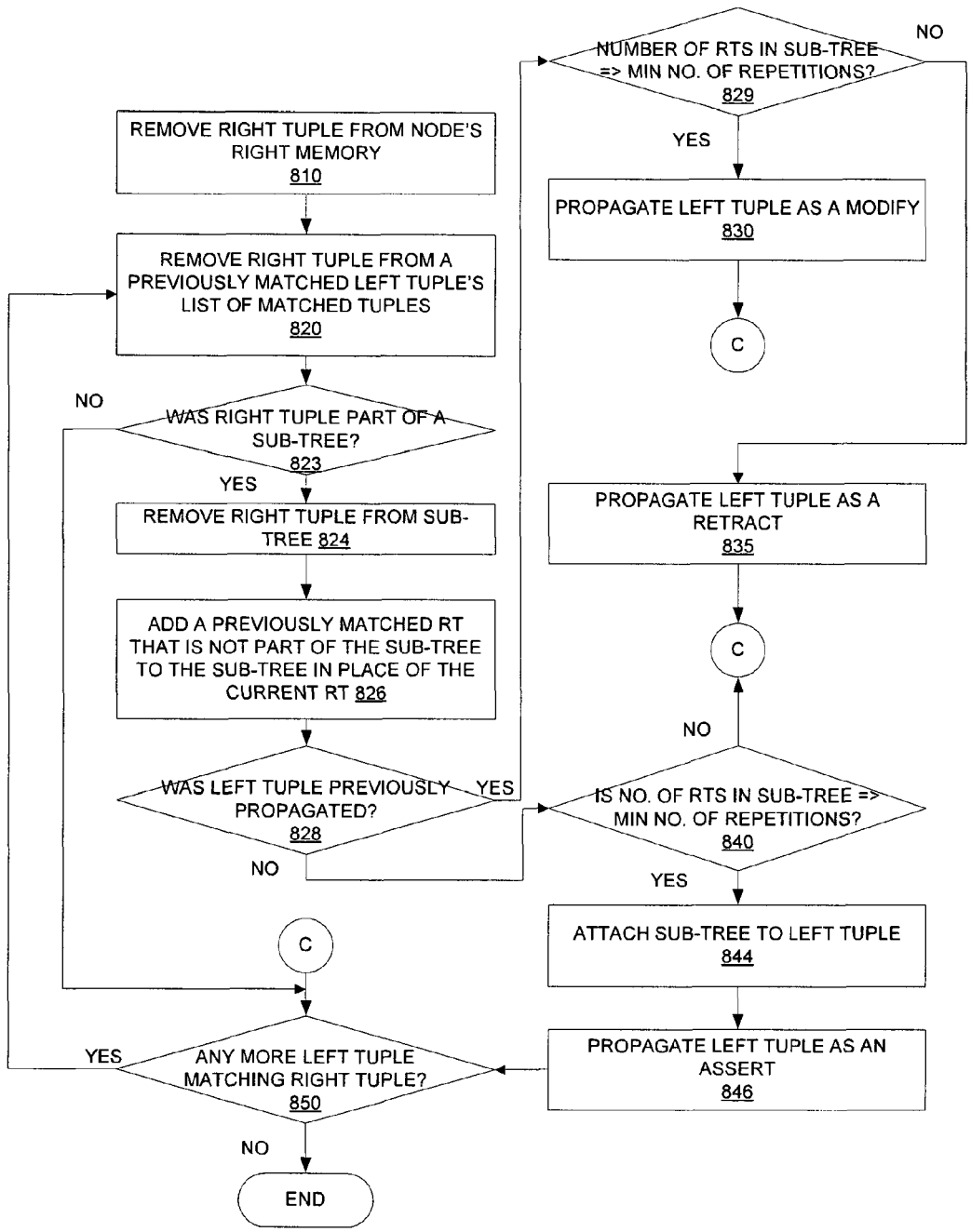
FIG. 8 illustrates one embodiment of a method to support right tuple retraction.

FIG. 8 illustrates one embodiment of a method to support right tuple retraction. The method can be performed by a rule engine executable on a computing machine, such as the one described above. Initially, the rule engine removes the right tuple from the repeat node's right memory (processing block 810). The rule engine further removes the right tuple from a previously matched left tuple's list of matched tuples (processing block 820). The rule engine checks if the right tuple is part of a sub-tree (processing block 823). If so, the rule engine transitions to block 824. Otherwise, the rule engine transitions to block 850.

At block 824, the rule engine removes the right tuple from the sub-tree. The rule engine may add another previously matched right tuple that is not part of the sub-tree to the sub-tree to replace the right tuple removed (processing block 826). Then the rule engine determines if the left tuple was previously propagated (processing block 828). If so, the rule engine transitions to block 829. Otherwise, the rule engine transitions to block 840.

At block 829, the rule engine checks if the number of right tuples in the sub-tree is greater than or equal to the minimum number of repetitions. If so, the rule engine propagates the left tuple as a modify (processing block 830) and then transitions to block 850. Otherwise, the rule engine propagates the left tuple as a retract (processing block 835) and then transitions to block 850.

At block 840, the rule engine checks if the number of right tuples in the sub-tree is greater than or equal to the minimum number of repetitions. If so, the rule engine attaches the sub-tree to the left tuple (processing block 844) and then propagates the left tuple as an assert (processing block 846). Then the rule engine transitions to block 850. Otherwise, the rule engine directly transitions to block 850.

At block 850, the rule engine determines if there is any more left tuple matching the right tuple. If there is, then the rule engine returns to block 820 to repeat the above operations on the next left tuple. Otherwise, the process ends.

Figure 9A:
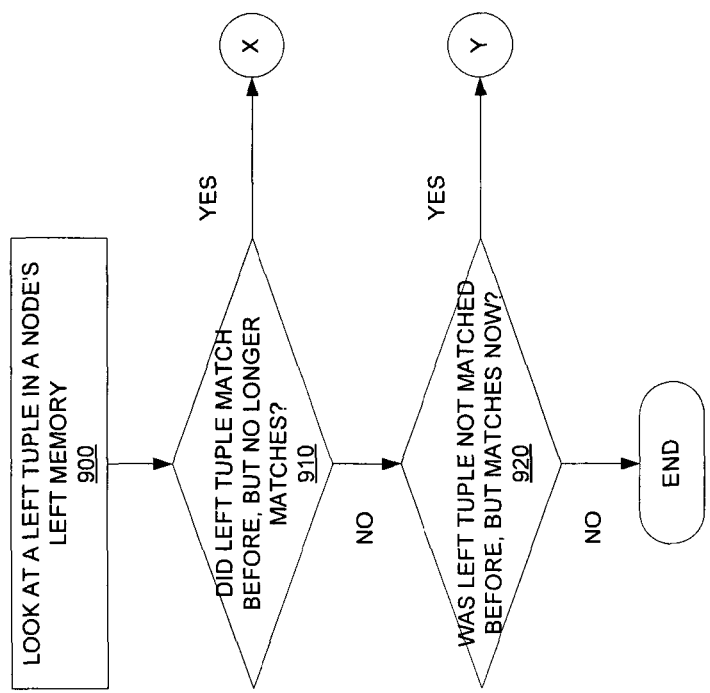
FIGS. 9A-9C illustrates one embodiment of a method to support right tuple modification.
Figure 9B:
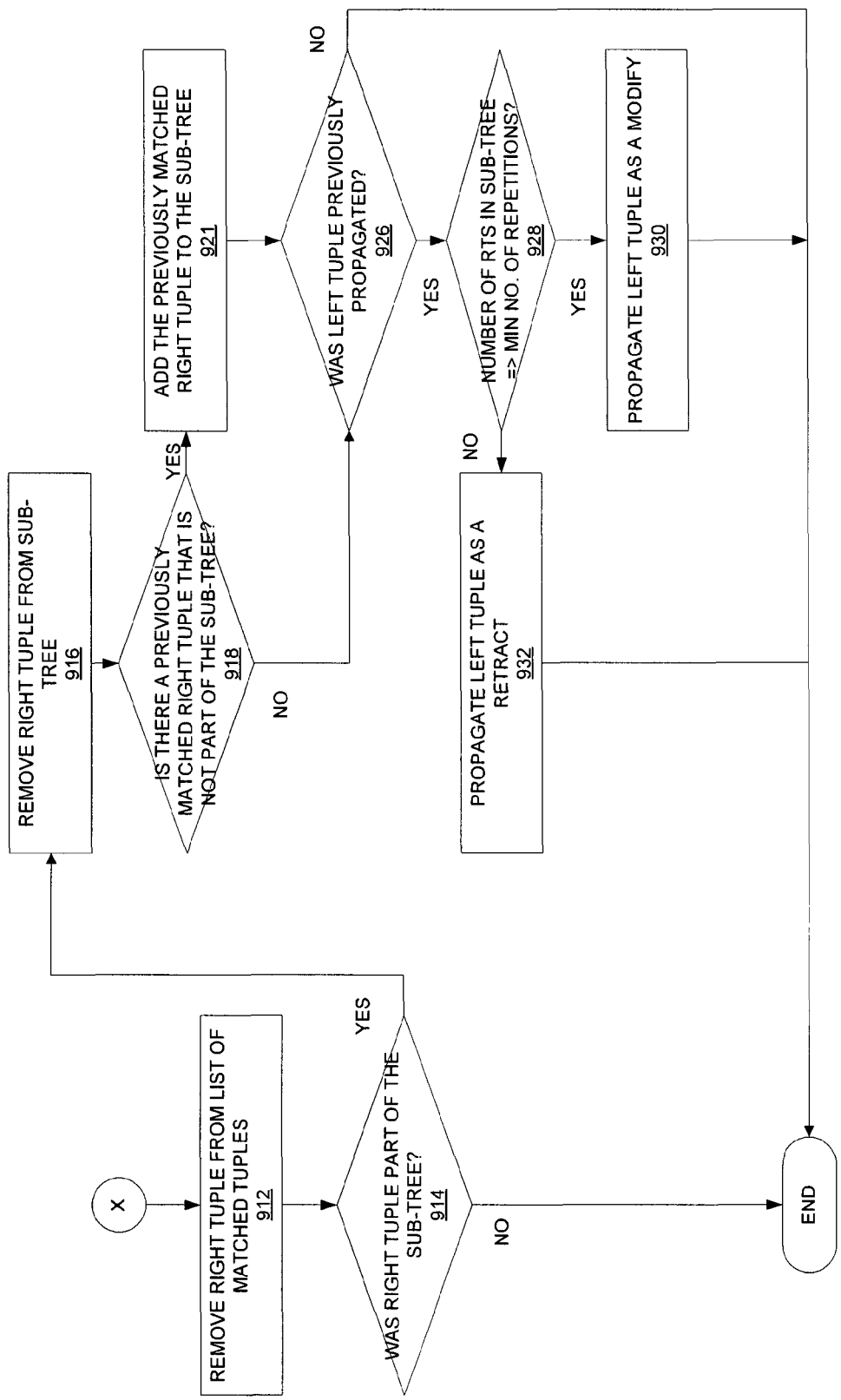
Figure 9C:
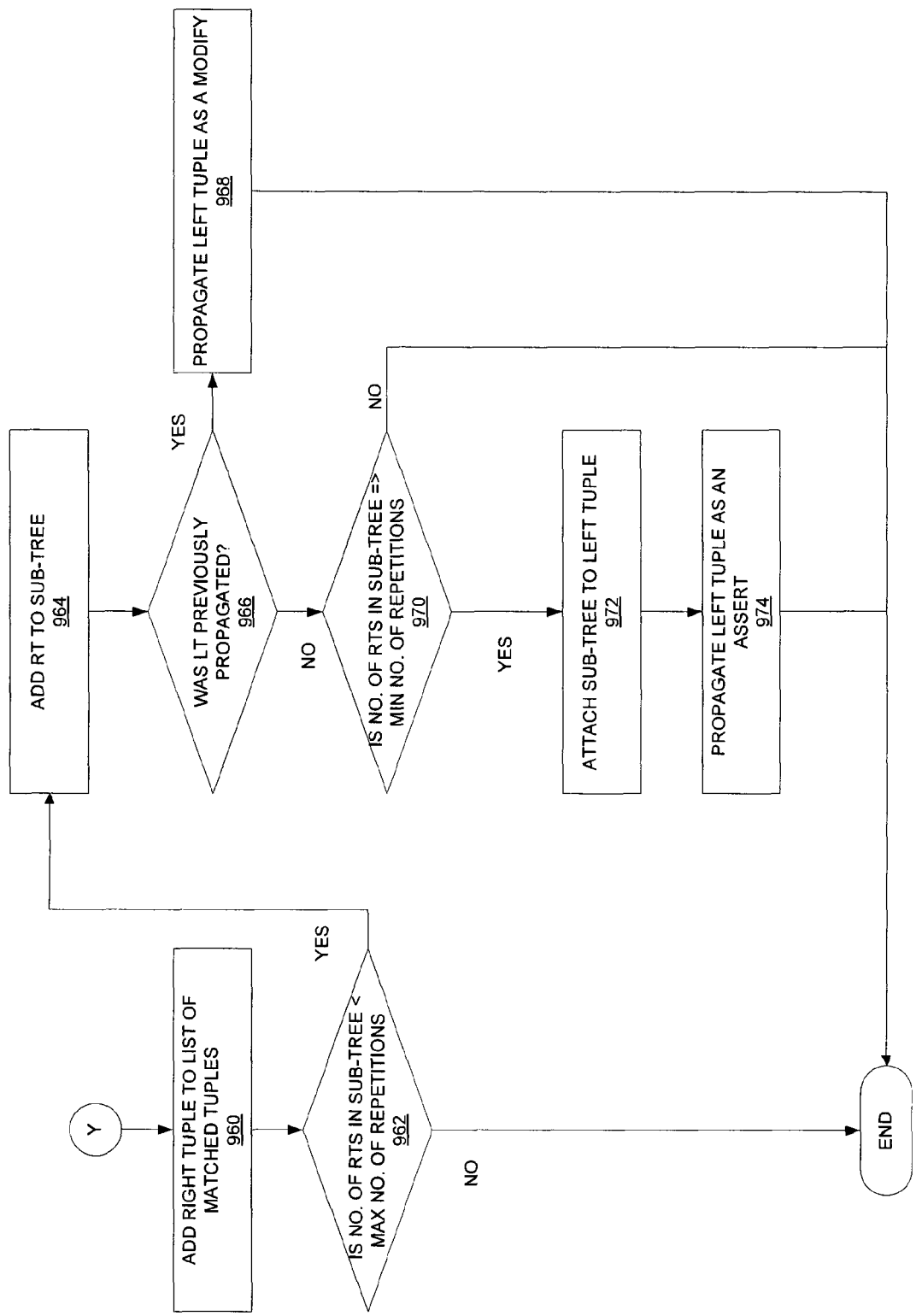

FIG. 9A-9C illustrates one embodiment of a method to support right tuple modification. The method can be performed by a rule engine executable on a computing machine, such as the one described above. Referring to FIG. 9A, the rule engine looks at a left tuple in a repeat node's left memory (processing block 900). The rule engine checks if the left tuple was matched before, but no longer matches (processing block 910). If so, the rule engine transitions to block 912 in FIG. 9B. Otherwise, the rule engine checks if the left tuple was not matched before, but matches now (processing block 920). If so, the rule engine transitions to block 960. Otherwise, the process ends.

Referring to FIG. 9B, the rule engine removes the right tuple from the list of matched tuples (processing block 912). Then the rule engine checks if the right tuple was part of a sub-tree (processing block 914). If not, then the process ends. Otherwise, the rule engine removes the right tuple from the sub-tree (processing block 916). Then the rule engine checks if there is a previously matched right tuple that is not part of the sub-tree (processing block 918). If there is, the rule engine adds it to the sub-tree (processing block 921) and then transitions to block 926. Otherwise, the rule engine goes directly to block 926.

At block 926, the rule engine checks if the left tuple was previously propagated. If not, then the process ends. Otherwise, the rule engine further checks if the number of right tuples in the sub-tree is greater than or equal to the minimum number of repetitions (processing block 928). If so, the rule engine propagates the left tuple as a modify (processing block 930) and the process ends. Otherwise, the rule engine propagates the left tuple as a retract (processing block 932) and the process ends.

Referring to FIG. 9C, the rule engine adds the right tuple to the list of matched tuples (processing block 960). Then the rule engine checks if the number of right tuples in the sub-tree is less than the maximum number of repetitions (processing block 962). If not, the process ends. Otherwise, the rule engine adds the right tuple to the sub-tree (processing block 964). Then the rule engine checks if the left tuple was previously propagated (processing block 966). If so, then the rule engine propagates the left tuple as a modify (processing block 968) and then the process ends. Otherwise, the rule engine further checks if the number of right tuples is greater than or equal to the minimum number of repetitions (processing block 970). If not, the process ends. Otherwise, the rule engine attaches the sub-tree to the left tuple (processing block 972) and then propagates the left tuple as an assert (processing block 974). Then the process ends.

Figure 10:
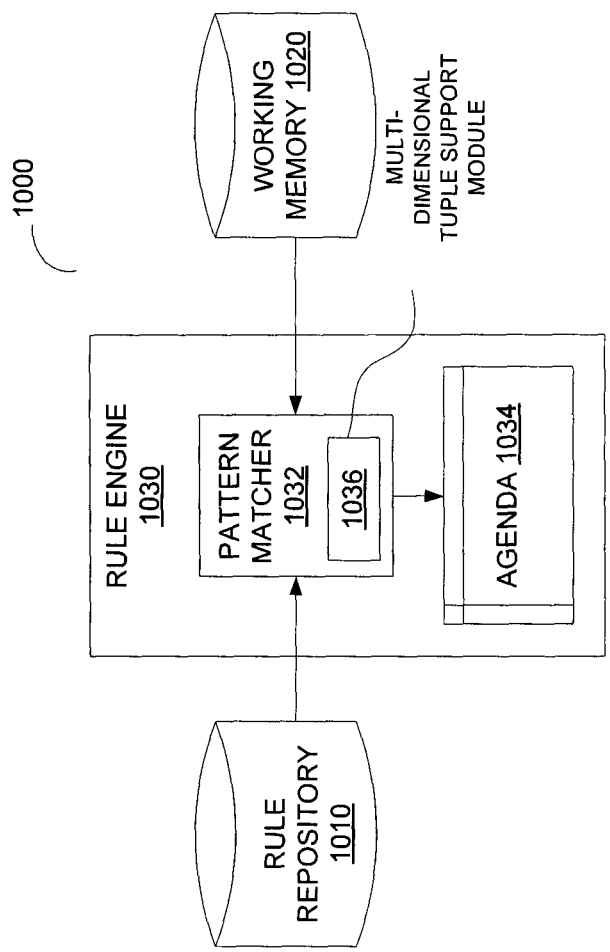
FIG. 10 shows one embodiment of a rule engine usable with some embodiments of the present invention.

FIG. 10 shows one embodiment of a rule engine usable to implement support for multi-dimensional tuples. In some embodiments, a rule engine 1030 is operatively coupled to a rule repository 1010 and a working memory 1020. The rule repository 1010 is a logical space that stores a rule set having a number of rules. The rule repository 1010 may also be referred to as a production memory. The working memory 1020 is a logical space that stores data objects (also referred to as facts) that have been asserted. The rule repository 1010 and the working memory 1020 can be implemented using one or more computer-readable storage devices, such as optical disks, CD-ROMs, and magnetic-optical disks; read-only memories (ROMs); random access memories (RAMs); EPROMs; EEPROMs; magnetic or optical cards; etc.

In some embodiments, the rule engine 1030 includes a pattern matcher 1032 and an agenda 1034. The pattern matcher 1032 generates network (such as a Rete network) to evaluate the rules from the rule repository 1010 against the data objects from the working memory 1020. One or more of the nodes within the network are multiple-input nodes, such as a beta node. A multi-dimensional tuple support module 1036 within the pattern matcher 1032 may create repeat nodes for rules with repetitions in order to create multi-dimensional tuples. Details of some examples of implementing support for multi-dimensional tuples in a rule engine have been described above.

As the data objects propagating through the network, the pattern matcher 1032 evaluates the data objects against the rules. Fully matched rules result in activations, which are placed into the agenda 1034. The rule engine 1030 may iterate through the agenda 1034 to execute or fire the activations sequentially. Alternatively, the rule engine 1030 may execute or fire the activations in the agenda 1034 randomly.

Figure 11:
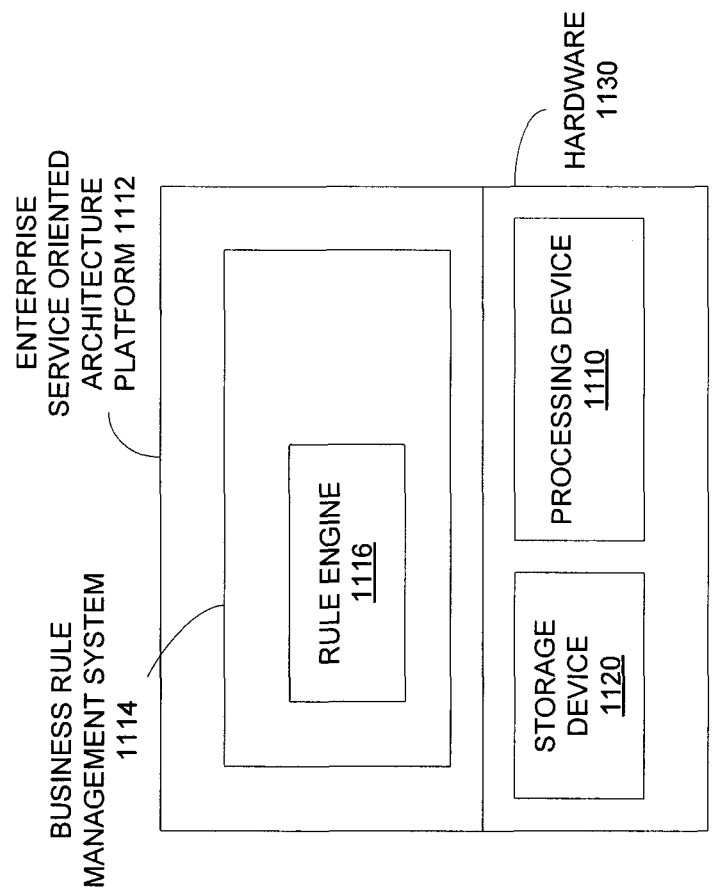
FIG. 11 shows one embodiment of an enterprise service oriented architecture (SOA) platform.

FIG. 11 shows one embodiment of enterprise service oriented architecture (SOA) platform usable in some embodiments of the invention. In general, the enterprise SOA platform 1112 can integrate applications, services, transactions, and business components into automated business processes. An enterprise can use the enterprise SOA platform 1112 to integrate services, handle business events, and automate business processes more efficiently, linking information technology resources, data, services, and applications across the enterprise. For example, a bank may deploy the enterprise SOA platform 1112 to integrate various banking services (e.g., mortgage, personal banking, etc.), handle business events (e.g., opening and closing of a bank account, overdraft, etc.), and automate business processes (e.g., direct deposit, payment of bills, etc.).

The enterprise SOA platform 1112 may include various middleware components, such as a business rule management system (BRMS) 1114, which further includes a rule engine 1116. One embodiment of the rule engine 1116 is illustrated in FIG. 10. The rule engine 1116 may be operable to evaluate data against rules (e.g., business rules), including rules with repetitions. In some embodiments, the rule engine 1116 may create multi-dimensional tuples to store facts that match a rule with repetitions during evaluation of rules. Some embodiments of the methods to create and use multi-dimensional tuples have been discussed above.

The enterprise SOA platform 1112 is executable on hardware 1130, which may include a processing device 1110. The processing device 1110 can include one or more general purpose processing devices, such as a microprocessor, a central processing unit, or the like. More particularly, the processing device 1110 may be complex instruction set computing (CISC) microprocessor, reduced instruction set computing (RISC) microprocessor, very long instruction word (VLIW) microprocessor, or processing device implementing other instruction sets, or processing devices implementing a combination of instruction sets. The processing device 1110 may also be one or more special-purpose processing devices such as an application specific integrated circuit (ASIC), a field programmable gate array (FPGA), a digital signal processor (DSP), network processor, or the like. The hardware 1130 further includes a storage device 1120.

In some embodiments, the storage device 1120 may include one or more computer-accessible storage media (also known as computer-readable storage media). Some examples of computer-accessible storage media include any type of disk, such as optical disks, CD-ROMs, and magnetic-optical disks; read-only memories (ROMs); random access memories (RAMs); EPROMs; EEPROMs; magnetic or optical cards; or any type of media suitable for storing electronic instructions and/or data. The storage device 1120 can store instructions executable by the processing device 1110, as well as data usable by the processing device 1110.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "evaluating" or "creating" or "querying" or "inserting" or "building" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description above. In addition, the present invention is not described with reference to any particular programming language. It will be appreciated that a variety of programming languages may be used to implement the teachings of the invention as described herein.

Thus, some embodiments of multi-dimensional tuples and a method and apparatus to support multi-dimensional tuples in rule engines have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
  evaluating, by a rule engine executed by a processing device, facts in a working memory stored on a data storage device against a rule with repetitions; and
  creating, by the rule engine, a multi-dimensional tuple to hold a set of the facts that matches the rule, the multi-dimensional tuple comprising a plurality of elements, wherein each of the plurality of elements comprises a complex index, and wherein each of the plurality of elements is a single fact or a tree structure for holding a plurality of facts of a repetition group that matches the rule with repetitions.

2. The method of claim 1, further comprising using the multi-dimensional tuple to propagate the set of the facts that matches the rule through a Rete network.

3. The method of claim 1, wherein the tree structure comprises a plurality of leaf nodes, each of the plurality of leaf nodes containing a distinct one of the plurality of facts of the repetition group.

4. The method of claim 1, wherein the tree structure comprises a plurality of non-leaf nodes, each of the plurality of non-leaf nodes containing a repetition placeholder.

5. The method of claim 1, further comprising:
  querying, by the rule engine, the plurality of facts of the repetition group using a plurality of properties, comprising a length, a first, a last, and an iterator.

6. The method of claim 1, further comprising:
  building, by the rule engine, a Rete network for evaluating a rule set, wherein the rule set comprises the rule with repetitions; and
  inserting, by the rule engine, a repeat node in the Rete network to collect the plurality of facts of the repetition group.

7. The method of claim 1, wherein the rule with repetitions is a business rule.

8. The method of claim 1, further comprising:
  using, by the rule engine, an accumulate node as a repeat node; and
  inserting, by the rule engine, the repeat node into a Rete network to evaluate the rule with repetitions.

9. An apparatus comprising:
a storage device to store a working memory comprising facts; and
a processing device coupled to the storage device, to evaluate the facts against a plurality of rules, which comprises a rule with repetitions, and to create a multi-dimensional tuple to hold a set of facts that matches the rule, the multi-dimensional tuple comprising a plurality of elements, wherein each of the plurality of elements comprises a complex index, and
wherein each of the plurality of elements is a single fact or a tree structure to hold a plurality of facts of a repetition group that matches the rule with repetitions.

10. The apparatus of claim 9, wherein the tree structure comprises a plurality of leaf nodes, each of the plurality of leaf nodes containing a distinct one of the plurality of facts of the repetition group.

11. The apparatus of claim 9, wherein the tree structure comprises a plurality of non-leaf nodes, each of the plurality of non-leaf nodes containing a repetition placeholder.

12. The apparatus of claim 9, the processing device to query the plurality of facts of the repetition group using a plurality of properties, comprising a length, a first, a last, and an iterator.

13. The apparatus of claim 9, the processing device to build a Rete network for evaluating the plurality of rules, and to insert a repeat node in the Rete network to collect the plurality of facts of the repetition group of the rule with repetitions.

14. The apparatus of claim 9, wherein the rule with repetitions is a business rule.

15. The apparatus of claim 9, the processing device to use an accumulate node as a repeat node and to insert the repeat node into a Rete network to evaluate the rule with repetitions.

16. A non-transitory computer-readable storage medium embodying instructions that, when executed by a processing device, will cause the processing device to execute operations comprising:
evaluating, by a rule engine executed by the processing device, facts in a working memory stored on a data storage device against a rule with repetitions; and
creating, by the rule engine, a multi-dimensional tuple to hold a set of the facts that matches the rule, the multi-dimensional tuple comprising a plurality of elements, wherein each of the plurality of elements comprises a complex index, and wherein each of the plurality of elements is a single fact or a tree structure for holding a plurality of facts of a repetition group that matches the rule with repetitions.

17. The non-transitory computer-readable storage medium of claim 16, wherein the tree structure comprises a plurality of leaf nodes and a plurality of non-leaf nodes, each of the plurality of leaf nodes containing a distinct one of the plurality of facts of the repetition group and each of the plurality of non-leaf nodes containing a repetition placeholder.

18. The non-transitory computer-readable storage medium of claim 16, wherein the operations further comprises:
querying, by the rule engine, the plurality of facts of the repetition group using a plurality of properties, comprising a length, a first, a last, and an iterator.

19. The non-transitory computer-readable storage medium of claim 16, wherein the operations further comprises:
building, by the rule engine, a Rete network for evaluating a rule set, wherein the rule set comprises the rule with repetitions; and
inserting, by the rule engine, a repeat node in the Rete network to collect the plurality of facts of the repetition group.

20. The non-transitory computer-readable storage medium of claim 16, wherein the operations further comprises:
using, by the rule engine, an accumulate node as a repeat node; and inserting, by the rule engine, the repeat node into a Rete network to evaluate the rule with repetitions.

* * * * *